United States Patent
Cho

(10) Patent No.: US 7,302,277 B2
(45) Date of Patent: Nov. 27, 2007

(54) MOBILE COMMUNICATION TERMINAL EQUIPPED WITH USER IDENTIFICATION MODULE AND METHOD OF IMPROVING BOOT SPEED OF THE SAME

(75) Inventor: Hwang-Joo Cho, Kangnam-Gu (KR)

(73) Assignee: Pantech & Curitel Communications, Inc., Seoul (KR)

( * ) Notice: Subject to any disclaimer, the term of this patent is extended or adjusted under 35 U.S.C. 154(b) by 43 days.

(21) Appl. No.: 11/130,147

(22) Filed: May 17, 2005

(65) Prior Publication Data

US 2006/0121932 A1 Jun. 8, 2006

(30) Foreign Application Priority Data

Nov. 25, 2004 (KR) .................. 10-2004-0097643

(51) Int. Cl.
*H04M 1/00* (2006.01)
(52) U.S. Cl. ................. 455/550.1; 455/558
(58) Field of Classification Search .......... 455/558, 455/550.1
See application file for complete search history.

(56) References Cited

U.S. PATENT DOCUMENTS 4,145,735 A * 3/1979 Soga .................. 710/264
6,411,822 B1 * 6/2002 Kraft .................. 455/558

* cited by examiner

*Primary Examiner*—Lester G. Kincaid
*Assistant Examiner*—Steven Lim
(74) *Attorney, Agent, or Firm*—Oblon, Spivak, McClelland, Maier & Neustadt, P.C.

(57) ABSTRACT

Disclosed is a technology associated with booting up a mobile communication terminal equipped with a user identification module (UIM).

A method of improving the boot speed of a mobile communication terminal equipped with a UIM according to the present invention includes: a) handing over controllership, by a user interface (UI) task responsible for an initial UI process, to a UIM task in a process of reading a phonebook stored in the UIM during booting; b) setting parameters necessary for reading the phonebook stored in the UIM by the UIM task which has taken over the controllership from the UI task; c) reading records composing the phonebook one by one and copying each record into RAM by the UIM task after setting of the parameters is completed; and d) handing over the controllership to the UI task by the UIM task after the UIM task copies the records into the RAM.

4 Claims, 4 Drawing Sheets

MOBILE COMMUNICATION TERMINAL EQUIPPED WITH USER IDENTIFICATION MODULE AND METHOD OF IMPROVING BOOT SPEED OF THE SAME

BACKGROUND OF THE INVENTION

This application claims the priority of Korean Patent Application No. 2004-97643, filed on Nov. 25, 2004, in the Korean Intellectual Property Office, the disclosure of which is incorporated herein in its entirety by reference.

1. Field of the Invention

The present invention relates to a mobile communication terminal and, more particularly, to a technology associated with booting up a mobile communication terminal equipped with a user identification module.

2. Description of Related Art

The user identification module has been introduced for more secure user identification as a measure against the use of counterfeit mobile phones or for the use of international roaming services. The user identification module refers to a detachable subscriber identification module (SIM) or user identification module (UIM). SIM has been introduced to an early GSM-based mobile communication system, while UIM has been developed for use in a CDMA-based mobile communication system by CDMA providers after the introduction of the GSM-based SIM.

The user identification module (which refers to the UIM used in the CDMA scheme in the present invention) is a smart card and comprises a microprocessor and a memory chip. The memory chip of UIM stores subscriber information, such as phone number, password, and billing, network registration information, which a user requires for using mobile communication services offered over a mobile communication network, phonebook data, short message service (SMS) data and the like.

In a conventional mobile communication terminal equipped with the UIM, it has taken a long time to copy a phonebook stored in UIM into RAM at boot time, causing a decrease in boot speed. First, a description will now be given of a process of copying a phonebook stored in ROM into RAM at the boot time of a conventional mobile communication terminal having no UIM with reference to FIG. 1.

FIG. 1 is a schematic block diagram showing a construction necessary for copying a phonebook stored in ROM into RAM at the boot time of a conventional mobile communication terminal. Upon power-on of the mobile communication terminal, a user interface (UI) task 100 displays an initial screen on a liquid crystal display (LCD) device which is a user interface. To copy a phonebook stored in ROM 120, which is a non-volatile (NV) memory, into RAM 130 during the boot process, the UI task 100 hands over controllership to a NV task 110 which is responsible for processing the NV memory. The NV task 110 accesses the ROM 120, reads one of records composing the phonebook, writes it to the RAM 130, and then hands over the controllership to the UI task 100. The UI task 100 and the NV task 110 continue to hand over the controllership to each other until all the records composing the phonebook stored in ROM 120 are copied. This is called a task switching, which is a process of handing over the controllership between tasks running on an operating system of a mobile communication terminal.

The conventional mobile communication terminal reads the records composing the phonebook stored in ROM one by one and copies the records into RAM at boot time. In a case of a phonebook composed of 250 records, task switching required for the 250 records in the conventional mobile communication terminal has little effect on the boot speed of the terminal. However, in a case of a mobile communication terminal equipped with UIM, the conventional technology of processing a phonebook at boot time has an effect on the boot speed, which will be described in detail with reference to FIG. 2. FIG. 2 is a schematic block diagram showing a construction necessary for copying a phonebook stored in a user identification module into RAM at the boot time of a conventional mobile communication terminal equipped with a UIM. The process of reading a phonebook stored in a UIM and copying it into RAM at the boot time of the mobile communication terminal equipped with the UIM shown in FIG. 2 is a process obtained by adding an additional algorithm to an existing task switching algorithm rather than by modifying the existing task switching algorithm.

The phonebook can be stored into ROM and/or UIM 130. A description will now be given of a process of reading the phonebook stored in the UIM 230 at boot time, which composes the gist of the present invention. First, upon power-on of a mobile communication terminal, a UI task 200 is activated and displays an initial screen on an LCD device which is a user interface. The UI task 200 hands over controllership to the NV task 210 for copying the phonebook stored in the UIM 230 into RAM 240 during the boot process. The NV task 210 performs a well-known initial process for accessing the UIM 230. That is, the NV task 210 determines what items to access and whether to read or write, and then sets corresponding parameters. In this case, suppose that a parameter necessary for reading the phonebook is set.

Next, the NV task 210 hands over the controllership to the UIM task 220. The UIM task 220, which has taken over the controllership and has been activated, reads one of records composing the phonebook from the UIM 230 linked with the UIM task 220, and hands over the controllership to the NV task 210. The NV task 210 copies the one of records composing the phonebook read from the UIM task 220 into RAM 240, and then hands over the controllership to the UI task 200. One of the records composing the phonebook is copied into RAM through the above-mentioned process, which needs four times of task switching. For example, in a case of a phonebook composed of 250 records, one thousand times of task switching should be performed since reading each record requires four times of task switching. Consequently, there is a problem in that so many times of task switching causes a decrease in boot speed.

SUMMARY OF THE INVENTION

The present invention provides a method and mobile communication terminal capable of improving boot speed by shortening the time necessary for copying a phonebook stored in a user identification module into RAM at the boot time of the mobile communication terminal.

The present invention further provides a method and mobile communication terminal capable of preventing occurrence of interrupt during a process of reading a phonebook stored in a user identification module and copying it into RAM.

According to an aspect of the present invention, there is provided a method of improving the boot speed of a mobile communication terminal equipped with a detachable UIM, the method comprising the steps of: a) handing over controllership, by a UI (user interface) task which is responsible for an initial UI process at boot time, to a UIM task in a process of reading a phonebook stored in the UIM during booting; b) setting parameters necessary for reading the phonebook stored in the UIM by the UIM task which has taken over the controllership from the UI task; c) reading records composing the phonebook one by one and copying each record into RAM by the UIM task after the setting of the parameters is completed; and d) handing over the controllership to the UI task by the UIM task after the UIM task copies the records composing the phonebook into the RAM.

The UIM task may be set as a highest-priority task of all the tasks if the UIM task takes over the controllership from the UI task in step b).

According to another aspect of the present invention, there is provided a mobile communication terminal equipped with a UIM, comprising: a UIM which is detachable and has information necessary for user identification and boot-up; a UI task for arranging UI environment at boot time after power-on; and a UIM task, which takes over controllership from the UI task and is activated in a process of reading a phonebook stored in the UIM according to a boot-up process, for setting parameters necessary for reading the phonebook, reading records composing the phonebook one by one and copying each record into RAM after the setting of the parameters is completed, and handing over the controllership to the UI task after the records composing the phonebook are copied into the RAM.

The UIM task may be set as a highest-priority task of all the tasks if the UIM task takes over the controllership from the UI task.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
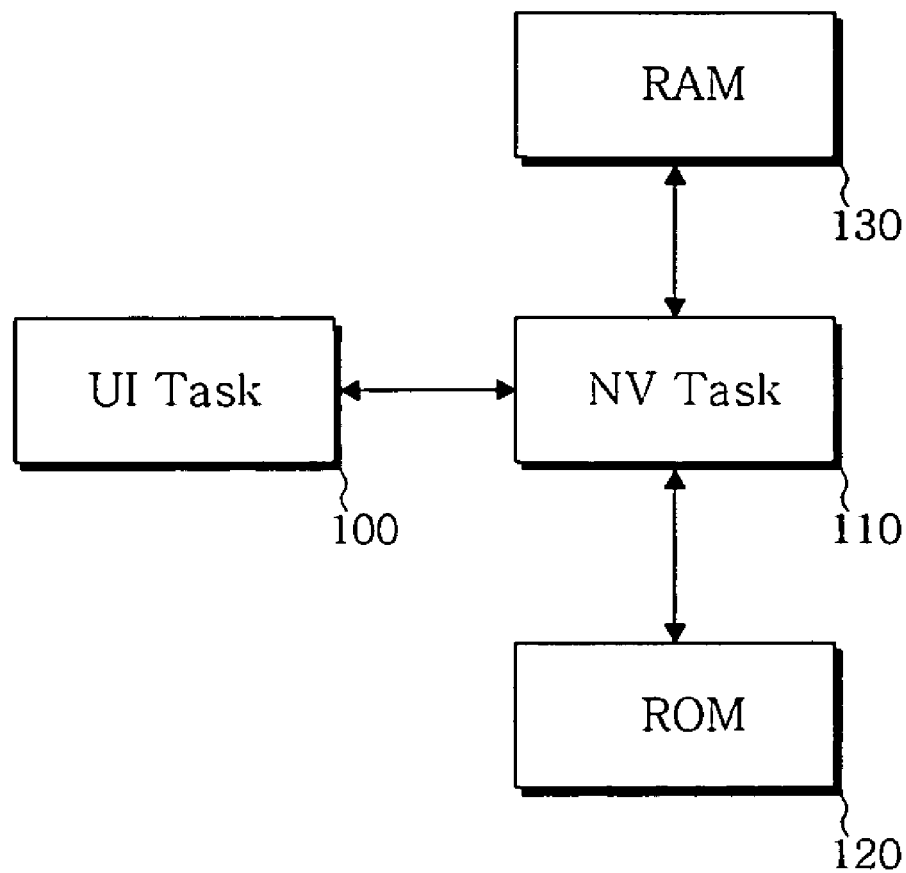
FIG. 1 is a schematic block diagram showing a construction necessary for copying a phonebook stored in ROM into RAM at the boot time of a conventional mobile communication terminal.
Figure 2:
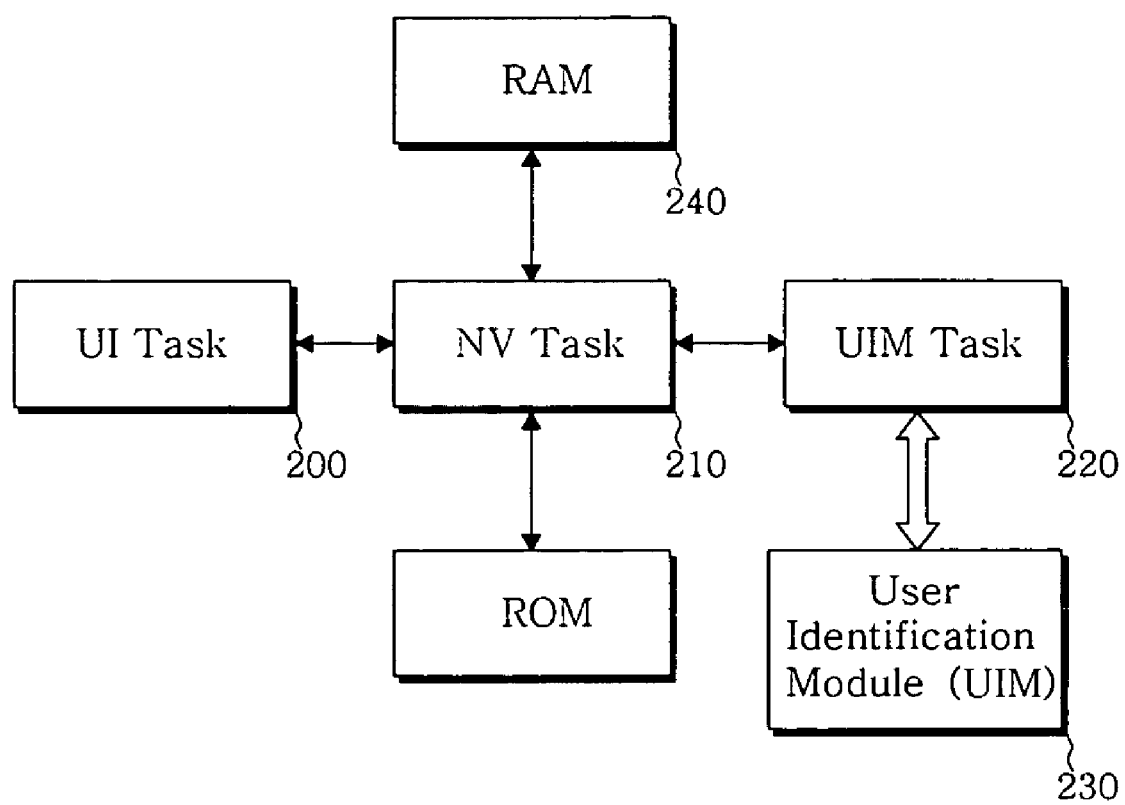
FIG. 2 is a schematic block diagram showing a construction necessary for copying a phonebook stored in a user identification module into RAM at the boot time of a conventional mobile communication terminal equipped with a UIM.
Figure 3:
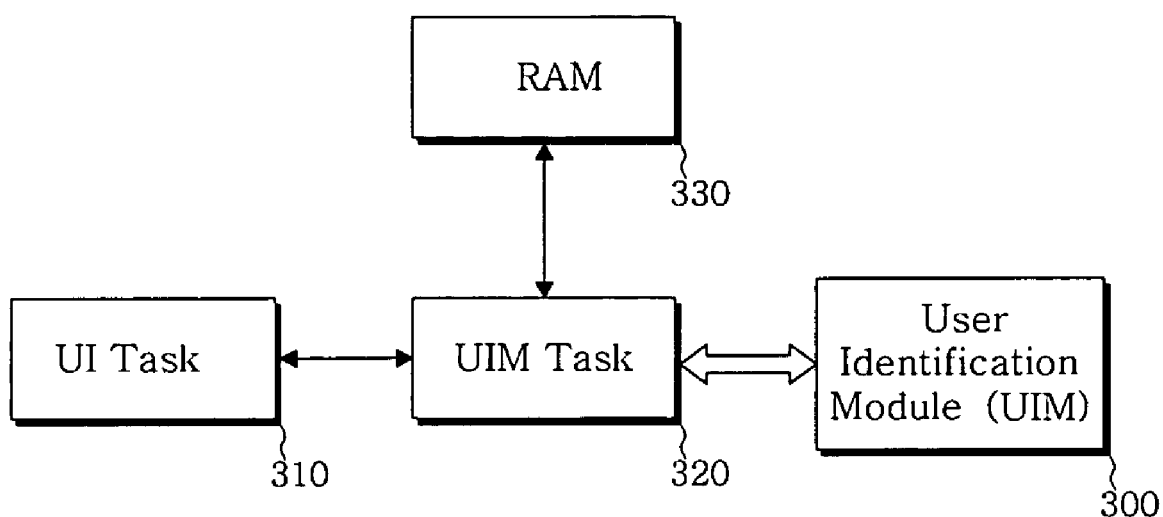
FIG. 3 is a schematic block diagram showing a construction necessary for copying a phonebook stored in a user identification module into RAM at the boot time of a mobile communication terminal equipped with a UIM in accordance with an embodiment of the present invention.

FIG. 3 is a schematic block diagram showing a construction necessary for copying a phonebook stored in a user identification module into RAM at the boot time of a mobile communication terminal equipped with a UIM in accordance with an embodiment of the present invention. The mobile communication terminal comprises a UIM 300, a UI task 310, and a UIM task 320. The UIM 300 comprises a microprocessor and a memory chip. The memory chip stores user information, such as phone number, password, and billing, network registration information, which a user requires for using mobile communication services offered over a mobile communication network, SMS data, phonebook data associated with the present invention and the like.

The UI task 310 typically has controllership at the boot time of the mobile communication terminal. The UI task 310 starts to boot, for example, by displaying a boot screen (e.g., animation) on an LCD device. To copy the phonebook stored in the UIM 300 into RAM 330 during the boot process of the mobile communication terminal, the UI task 310 hands over controllership to the UIM task 320 through task switching (i.e., by transmitting a signal such as UIM_CMD_INITIAL_Q_SIG). The UIM task 320 is a task for performing the above-mentioned operation associated with the UIM 300 and takes the controllership through UIM_CMD_INITIAL_Q_SIG transmitted from the UI task 310. In addition, the UIM task 320 receives from the UI task 310 information about item type (e.g., 'phonebook' in the present invention), about whether to perform a read/write operation (e.g., 'read' operation in the present invention), and the like. In this case, the information is one concerning processes which the UIM task 320 should perform while linking with the UIM 300. The UIM task 320 sets well-known parameters (phonebook, number of records composing the phonebook, read, etc.) necessary for reading the phonebook according to the received item information and read/write information.

After setting the parameters, the UIM task 320, linking with the UIM 300, copies all the records composing the phonebook stored in the UIM 300 into RAM 330 by repeatedly performing the processes of reading the records composing the phonebook stored in the UIM 300 one by one and copying the records into specified areas of RAM 330 in the mobile communication terminal. Once all the records in the phonebook stored in the UIM 300 are copied into the RAM 330, the UIM task 320 hands over controllership to the UI task 310 through task switching (i.e., by transmitting a signal such as UI_UIM_STATUS_SIG). The UI task 310 receives the controllership from the UIM task 320 through task switching and performs the boot process. Once the boot process is completed, the user can use a phonebook list in the UIM 300 copied into RAM 330.

Since the mobile communication terminal in accordance with the embodiment of the present invention performs task switching only two times for copying the phonebook stored in the UIM into RAM at boot time, it is possible to remarkably shorten the time required for copying the phonebook stored in the UIM into RAM at boot time, thereby significantly improving the boot speed.

In accordance with another embodiment of the present invention, the UIM task 320 is set as a highest-priority task of all the tasks. Preferably, when the UI task 310 hands over the controllership to the UIM task 320 as described above, the terminal's operating system sets the UIM task 320 to the highest-priority task among all the tasks (e.g., Rx, TX, SND, FS, NV, SRCH, SLEEP, DIAG, etc.) whose priorities have been already set.

Accordingly, when a collision occurs between the UIM task 320 and a different task, the UIM task 320 can read the phonebook stored in the UIM 300 and copy it into RAM 330 without occurrence of interrupt since the UIM task 320 has been set to the highest-priority task.

Figure 4:
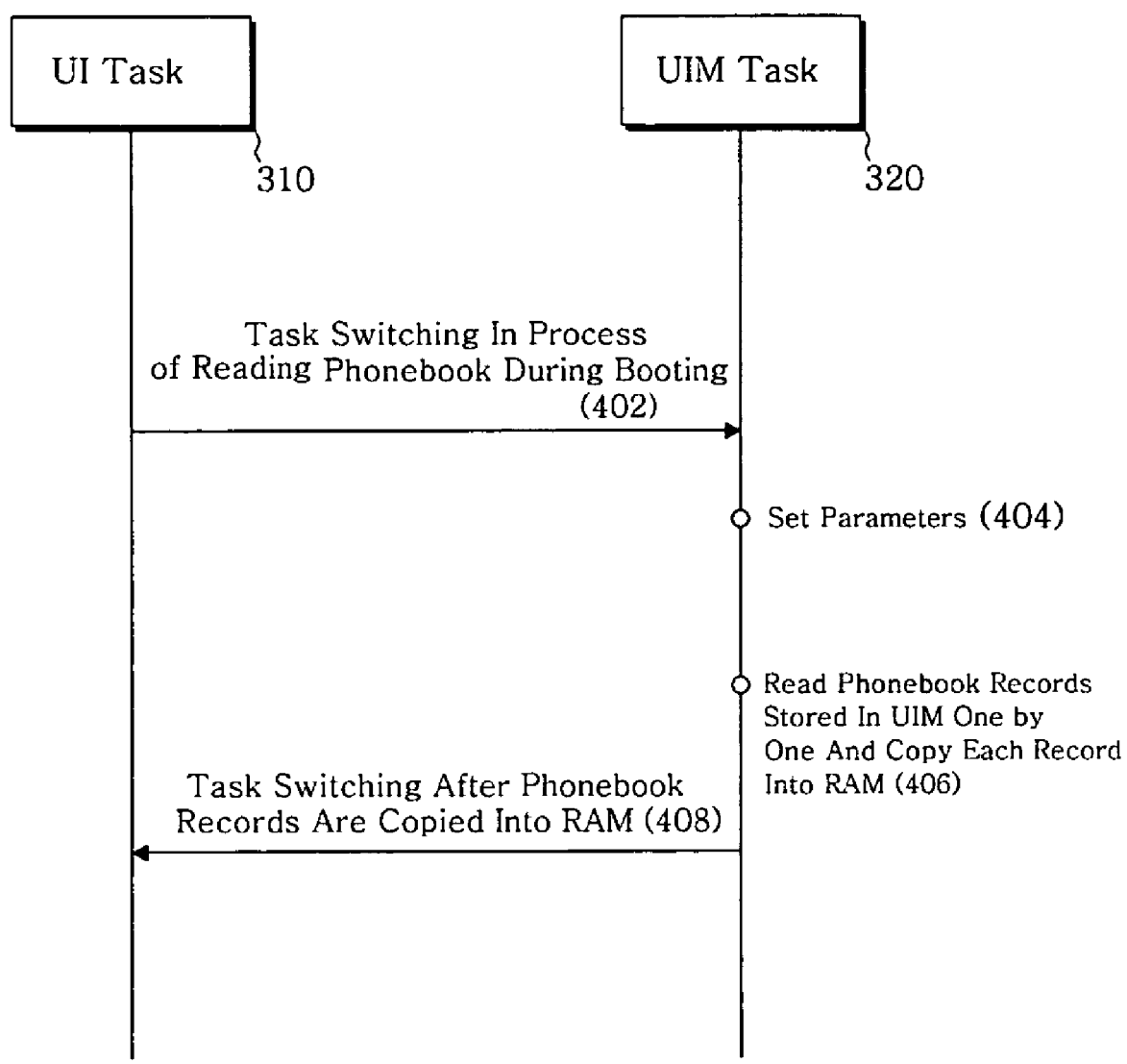
FIG. 4 is a flow chart showing a process of copying a phonebook stored in a user identification module into RAM at the boot time of a mobile communication terminal equipped with a UIM in accordance with an embodiment of the present invention.

FIG. 4 is a flow chart showing a process of copying a phonebook stored in UIM into RAM at the boot time of a mobile communication terminal equipped with the UIM in accordance with an embodiment of the present invention. Upon power-on of the mobile communication terminal by user, the UI task 310 having controllership, which is responsible for user interface environment, starts to boot the terminal by displaying an initial boot screen (e.g., animation) on an LCD device. In a process of reading the phonebook stored in the UIM 300 during booting, the UI task 310 hands over the controllership to the UIM task 320 through task switching to the UIM task 320 (step 402). The task switching from the UI task 310 to the UIM task 320 is achieved by transmitting a specific signal such as UIM_CMD_INITIAL_Q_SIG from the UI task 310 to the UIM task 320.

The UIM task 320 takes over the controllership through UIM_CMD_INITIAL_Q_SIG transmitted from the UI task 310. Though not shown, the UIM task 320 receives from the UI task 310 item information (phonebook) about processes which the UIM task 320 should perform and information to read the phonebook, and then sets corresponding parameters as described above(step 404). Once setting of the parameters is completed, the UIM task 320, linking with the UIM 300, reads records composing the phonebook stored in the UIM 300 one by one and copies each record into RAM 330 in the terminal (step 406). Once all the records composing the phonebook stored in the UIM 300 are copied into RAM 330, the UIM task 320 hands over the controllership to the UI task 310 through task switching to the UI task 310 (step 408). The task switching from the UIM task 320 to the UI task 310 is achieved by transmitting a specific signal such as UI_UIM_STATUS_SIG from the UIM task 320 to the UI task 310. The UI task 310 takes over the controllership through UI_UIM_STATUS_SIG transmitted from the UIM task 320, and then performs a well-known booting process.

Since the mobile communication terminal according to the present invention performs task switching only two times for reading the phonebook stored in UIM and copying it into RAM at boot time, it is possible to markedly shorten the time the phonebook is read from the UIM and copied into RAM at boot time, thereby significantly improving the boot speed.

In accordance with another embodiment of the present invention, when the UIM task 320 takes over controllership from the UI task 310 in step 402, the UIM task 320 is set as a highest-priority task of all the tasks. When the UI task 310 hands over the controllership to the UIM task 320 in step 402, the terminal's operating system sets the UIM task 320 to the highest-priority task among all the tasks. Accordingly, when a collision occurs between the UIM task 320 and a different task, the UIM task 320 can read the phonebook stored in the UIM 300 and copy it into RAM 330 without occurrence of interrupt since the UIM task 320 has been set to the highest-priority task.

As apparent from the above description, since the mobile communication terminal in accordance with the embodiment of the present invention performs task switching only two times for copying the phonebook stored in the UIM into RAM at boot time, it is possible to remarkably shorten the time required for copying the phonebook stored in the UIM into RAM at boot time, thereby significantly improving the boot speed.

Further, it is possible to prevent occurrence of interrupt while the phonebook stored in the UIM is read and copied into RAM.

While the present invention has been described with reference to exemplary embodiments thereof, it will be understood by those skilled in the art that various changes in form and details may be made therein without departing from the scope of the present invention as defined by the following claims.

What is claimed is:

1. A method of improving the boot speed of a mobile communication terminal equipped with a detachable UIM (user identification module), the method comprising the steps of:
    a) a first task switching of handing over controllership, from a UI (user interface) task which is responsible for an initial UI process at boot time, to a UIM task in a process of reading a phonebook stored in the UIM during booting;
    b) setting parameters necessary for reading the phonebook stored in the UIM;
    c) reading records composing the phonebook one by one and copying each record into RAM after the setting of the parameters is completed; and
    d) a second task switching of handing over the controllership to the UI task after the UIM task copies the records composing the phonebook into the RAM.

2. The method of claim 1, wherein the UIM task is set as a highest-priority task of all the tasks if the UIM task takes over the controllership from the UI task in step b).

3. A mobile communication terminal equipped with a UIM, comprising:
    a UIM which is detachable and has information necessary for user identification and boot-up;
    a UI task for arranging UI environment at boot time after power-on; and
    a UIM task, which performs task switching of taking over controllership from the UI task and is activated in a process of reading a phonebook stored in the UIM according to a boot-up process, for setting parameters necessary for reading the phonebook, reading records composing the phonebook one by one and copying each record into RAM after the setting of the parameters is completed, and performs a second task switching of handing over the controllership to the UI task after the records composing the phonebook are copied into the RAM.

4. The mobile communication terminal of claim 3, wherein the UIM task is set as a highest-priority task of all the tasks if the UIM task takes over the controllership from the UI task.

* * * * *